United States Patent
Bohlander

(10) Patent No.: US 9,090,781 B2
(45) Date of Patent: Jul. 28, 2015

(54) SOLVENT-FREE WATER-SOLUBLE SILANE-MODIFIED SILICATES

(75) Inventor: Ralf Bohlander, Erkrath (DE)

(73) Assignee: Cognis IP Management GmbH, Duesseldorf (DE)

( * ) Notice: Subject to any disclaimer, the term of this patent is extended or adjusted under 35 U.S.C. 154(b) by 433 days.

(21) Appl. No.: 13/147,425

(22) PCT Filed: Jan. 29, 2010

(86) PCT No.: PCT/EP2010/000530
§ 371 (c)(1),
(2), (4) Date: Aug. 2, 2011

(87) PCT Pub. No.: WO2010/089053
PCT Pub. Date: Aug. 12, 2010

(65) Prior Publication Data
US 2011/0283916 A1  Nov. 24, 2011

(30) Foreign Application Priority Data

Feb. 7, 2009  (EP) ..................................... 09001740

(51) Int. Cl.
| | | |
|---|---|---|
| C09D 1/04 | (2006.01) | |
| C01C 1/00 | (2006.01) | |
| C04B 41/68 | (2006.01) | |
| C01B 33/20 | (2006.01) | |
| C01B 33/32 | (2006.01) | |
| C04B 12/04 | (2006.01) | |
| C04B 28/26 | (2006.01) | |
| C09C 1/28 | (2006.01) | |
| C09C 1/30 | (2006.01) | |
| C09D 5/00 | (2006.01) | |
| C09D 5/18 | (2006.01) | |
| C04B 111/10 | (2006.01) | |

(52) U.S. Cl.
CPC . *C09D 1/04* (2013.01); *C01B 33/20* (2013.01); *C01B 33/32* (2013.01); *C01B 33/325* (2013.01); *C01C 1/00* (2013.01); *C04B 12/04* (2013.01); *C04B 28/26* (2013.01); *C04B 41/68* (2013.01); *C09C 1/28* (2013.01); *C09C 1/3081* (2013.01); *C09D 5/00* (2013.01); *C09D 5/18* (2013.01); *C04B 2111/1012* (2013.01)

(58) Field of Classification Search
CPC .............. C09D 1/04; C09D 5/00; C09D 5/18; C09C 1/28; C09C 1/3081; C01C 1/00; C01B 33/20; C01B 33/32; C01B 33/325; C04B 28/26; C04B 2111/1012; C04B 12/04; C04B 41/68; C04B 41/5024; C04B 41/4922
USPC .................. 106/634, 287.11, 287.13, 287.14, 106/287.15
See application file for complete search history.

(56) References Cited

U.S. PATENT DOCUMENTS

| | | | | |
|---|---|---|---|---|
| 3,721,574 A * | 3/1973 | Schneider et al. | ............ | 106/623 |
| 4,120,938 A * | 10/1978 | Haase et al. | .................. | 423/332 |
| 4,466,832 A * | 8/1984 | Yoshimura et al. | ........... | 106/626 |
| 4,609,487 A * | 9/1986 | Burkhardt et al. | ............ | 516/104 |
| 4,822,420 A * | 4/1989 | Burkhardt et al. | ............ | 106/632 |
| 4,927,749 A | 5/1990 | Dorn | | |
| 2005/0031790 A1* | 2/2005 | Jackson et al. | ............. | 427/372.2 |

FOREIGN PATENT DOCUMENTS

| | | |
|---|---|---|
| DE | 4418846 | 12/1995 |
| WO | WO-2006/010388 | 2/2006 |

OTHER PUBLICATIONS

Translation of DE4418846, Downloaded from https://www.google.com/patents/DE4418846A1?cl=en Feb. 17, 2015.*
"English Translation of DE4418846", Aug. 1, 2011, 19 pages.
"International Search Report for PCT/EP2010/000530", Apr. 3, 2010, 2 pages.
Professional English Translation of DE4418846, Sep. 4, 2014, 25 pages.

* cited by examiner

*Primary Examiner* — David M Brunsman
(74) *Attorney, Agent, or Firm* — Servilla Whitney LLC

(57) ABSTRACT

The invention relates to an aqueous solution of modified silicates, wherein the solution is free of organic solvents and is obtained by reacting (a) an initially charge aqueous solution of silicates of the general formula $M_2O \cdot nSiO_2$, wherein M is a cation from the group $Li^+$, $Na^+$, $K^+$, $NY_4^+$, where Y is a hydrogen atom and/or an alkyl or alkenyl radical having 1 to 22 C atoms, and (b) at least one silane of the general formula $R—(CH_2)_n—Si—(X)_3$ where X is independently a $CH_3$, $OCH_3$, $OC_2H_5$, $OC_3H_7$, $OCOCH_3$, H or Cl radical, and R is a saturated or unsaturated, linear or branched or ring-shaped radical having at least one O and/or N atom and at least 2 C atoms, and n is a number between 1 and 3; at temperatures from 5 to 100° C., and wherein the alcohols arising from the conversion are subsequently removed. The aqueous solution of modified silicates is used to hydrophilize surfaces, particularly for high-temperature coatings.

4 Claims, No Drawings

SOLVENT-FREE WATER-SOLUBLE SILANE-MODIFIED SILICATES

CROSS-REFERENCE TO RELATED APPLICATIONS

This application is the National Stage entry of PCT/EP2010/000530, filed on Jan.29, 2010, which claims priority to European Patent application number 09001740.1, filed on Feb.7, 2009, both of which are incorporated herein by reference in their entireties.

The present invention relates to the preparation of organically and inorganically modified soluble silicates in aqueous solution. These silicates are solvent-free hybrid inorganic-organic oligomers.

BACKGROUND

Field of the Invention

There exists a multitude of product solutions based on silicon which, after application as a coating, give rise to a substrate surface with improved properties with regard to fire protection, scratch resistance, corrosion resistance, etc. In principle, it is desirable to use very thin layers of inexpensive material without adverse phenomena such as VOCs (evaporation of solvents in use) or AOX wastewater pollution (organo-chlorine substances), if at all possible in the form of a solution (avoidance of dust) and preferably an aqueous solution. The application should especially also be possible by common simple means, such as spraying, roller application, knifecoating, etc, in order to avoid expensive surface modification processes, for example sputtering. It should be possible to match the formulation of the liquid coating material to various substrates.

It has now been found that particular modified soluble silicates meet the requirements stated above in an excellent manner.

The present application provides aqueous solutions of modified silicates, said solutions being free of organic solvents, obtainable by reacting (a) an initially charged aqueous solution of silicates of the general formula $M_2O \cdot nSiO_2$ where M is a cation from the group of $Li^+$, $Na^+$, $K^+$, $NY_4^+$ where Y is a hydrogen atom and/or an alkyl or alkenyl radical having 1 to 10 carbon atoms with (b) at least one organosilicon compound of the general formula (I)

  (I)

in which X is in each case independently a $CH_3$, $OCH_3$, $OC_2H_5$, $OC_3H_7$, $OCOCH_3$, H or Cl radical and R is a saturated or unsaturated, linear or branched, or cyclic radical having at least one oxygen and/or nitrogen atom and at least 2 carbon atoms, and n is from 1 to 3, at temperatures of 5 to 100° C., and then removing the alcohols formed in the reaction.

Component (a)

Possible components (a) here include especially what are called the waterglasses. Waterglasses are glassy, water-soluble alkali metal silicates (i.e. salts of silicic acids) which have solidified from the melt, or the viscous aqueous solutions thereof. In waterglass there are typically 1-4 mol of $SiO_2$ per 1 mol of alkali metal oxide ($M_2O$), and therefore, for example, sodium waterglass and potassium waterglass are typically also characterized by the mass ratio or molar ratio of $SiO_2$/alkali metal oxide and the density of the aqueous solution. They contain oligomeric silicate anions with alkali metal as the counterion (with, for example, M=K or Na). Particularly preferred waterglasses as reaction component (a) are sodium or potassium water-glasses. Preference is given to those waterglasses whose molar ratio of $SiO_2$:$M_2O$ is in the range from 2 to and preferably in the range from 2.5 to 3.5. Very particular preference is given to the range from 2.7 to 3.4. The waterglasses are preferably used as an aqueous solution which contains 15 to 50% by weight of solids (in dissolved form), particular preference being given to solutions with contents of 25 to 40% by weight.

Component (b)

Component (b) comprises organosilicon compounds which are likewise known. These preferably include silanes. This is basically a group name for silicon-hydrogen compounds.

In the context of the present invention, however, the soluble silicates of reaction component (a) are modified only with those silanes of the general formula (i):

  (i)

in which X is in each case independently a $CH_3$, $OCH_3$, $OC_2H_5$, $OC_3H_7$, $OCOCH_3$ or Cl radical and R is a saturated or unsaturated, linear or branched, or cyclic radical having at least one oxygen and/or nitrogen atom and at least 2 carbon atoms, and n is from 1 to 3. Preference is given in this context especially to those silanes of the general formula (ii): $R—(CH_2)_n—Si—(CH_3)(X)_2$ where X and n are each as defined above.

Suitable silanes are, for example, tris(trimethoxy)silane, octyltriethoxysilane, methyltriethoxysilane, methyltrimethoxysilane; isocyanatosilane such as tris[3-(trimethoxysilyl)propyl]isocyanurate; gamma-mercaptopropyltrimethoxysilane, bis(3-[triethoxysilyl]propyl) polysulfide, beta-(3,4-epoxycyclohexyl)ethyltrimethoxysilane, epoxysilanes, glycidoxy- and/or glycidoxypropyltrimethoxysilane, gamma-glycidoxypropylmethyldiethoxysilane, (3-glycidoxypropyl)trimethoxysilane, (3-glycidoxypropyl)hexyltrimethoxysilane, beta-(3,4-epoxycyclohexyl)ethyltriethoxysilane; silanes which contain vinyl groups, such as vinyltriethoxysilane, vinyltrimethoxysilane, vinyltris-(2-methoxyethoxy) silane, vinylmethyldimethoxysilane, vinyltriisopropoxysilane; gamma-methacryloyloxypropyltrimethoxysilane, gamma-methacryloyloxypropyltriisopropoxysilane, gamma-methacryloyloxypropyltriethoxysilane, octyltrimethyloxysilane, ethyltrimethoxysilane, propyltriethoxysilane, phenyltrimethoxysilane, 3-mercaptopropyltriethoxysilane, cyclohexyltrimethoxysilane, cyclohexyltriethoxysilane, dimethyldimethoxysilane, 3-chloropropyltriethoxysilane, 3-methacryloxypropyltrimethoxysilane, i-butyltriethoxysilane, trimethylethoxysilane, phenyldimethylethoxysilane, hexamethyldisiloxane, trimethylsilyl chloride, vinyltriethoxysilane, hexamethyldisilazane, and mixtures thereof. U.S. Pat. No. 4,927,749 discloses, in table 2, in column 9 line 10 to column 11, line 23, further suitable silanes which may also find use in the context of the present technical teaching. Particularly preferred silanes in the context of the present technical teaching are selected from the group of alkylalkoxysilanes, preferably of the trialkoxysilanes, with methyl, ethyl, propyl and/or butyl radicals. Additionally preferred are those trialkoxysilanes whose alkyl chain is interrupted by heteroatoms such as O or N. Preferred silanes are N-(2-aminoethyl)-3-aminopropylsilane or 3-aminopropyltriethoxysilane, or 3-glycidyloxypropyltrimethoxy- or 3-glycidyloxypropyltriethoxysilane. The organosilicon compounds can each be used alone or as a mixture, or else the partial hydrolyzates thereof with possible prior reduction of the alcohol released.

Component (c)

In one embodiment, the above-described conversion of components (a) and (b) is effected in the presence of a further (additional) component (c) which serves for inorganic modification of the oligomers; water-soluble salts of acidic oxides (glass network formers) are used.

The compounds (c) can be characterized by the general empirical formula $(Cat)_x(An)_yO_z$ where "Cat" denotes monovalent cations, "An" a glass-forming element, $(An)_yO_z$ di- or polyvalent anions; the indices x, y and z arise from the necessary charge balance of the components (c) which are neutral overall, where the indices may or may not be integers.

Ammonium, sodium and potassium are preferred as monovalent cations, in combination with anions from the group of the borates, phosphates, aluminates, molybdates, tungstates, ferrates, germanates, titanates, stannates or the oxo polyanions thereof, which may also be mixed with one another.

Particular preference is given to sodium and potassium as cations, and borates and polyphosphates as anions. Component (c) is preferably used in solid form.

The Reaction Regime

The soluble silicate component (a) is preferably used as a commercial fused glass-based waterglass solution. When the optional component (c) is used, it is dissolved in water, separately from component (a). Solution (a) is then mixed with solution (c) by stirring to give a clear solution. Alternatively, after mixing of solid silica sources with oxides $(An_vO_w)$ or oxysilicates $(An_dSi_eO_f)$ and the hydrothermal dissolution thereof in alkali metal hydroxide solution at temperatures in the range of 40-250° C. and especially 120-200° C., it is also possible to produce an inorganically modified (c) in (a) waterglass solution. The liquid silane component (b) is then metered into the inorganic (c) in (a) solution by dropwise addition.

The modified silicate oligomers which are the subject of the present invention are preferably prepared at room temperature (20° C.), if desired at elevated temperatures up to 80° C., particular preference being given to the temperature range from 20 to 50° C. for conversion to the organic-inorganic hybrids. The selection of the suitable reaction temperature depends on the reactivity of the silane component. Methoxysilanes are preferably converted at room temperature, and ethoxysilanes preferably at 40-50° C. On the other hand, the temperature in the reaction should not be selected at too high a level because most of the silane reactants do have noticeable volatility. After complete mixing of all components, stirring is continued until a transparent aqueous solution forms.

Only then is the mixture heated further to 60-100° C., preferably 70-80° C., in order to evaporate off the alcohols formed in the chemical reaction alone or together with water; the evaporation (distillative removal) can be promoted by reducing the pressure (application of reduced pressure).

As already explained, the removal of the alcohols formed in the reaction is an essential feature of the present invention. The alcohol can be removed by any methods in principle, preference being given to a distillative removal which can be effected at standard pressure or reduced pressure. In the course of a distillative removal, the removal of the alcohol effectively automatically also distills off water. This may necessitate further metered addition of water after this distillation step in order that the solution does not become overconcentrated and gelate.

The reaction product of components (a) and (b) has a weight ratio of the $SiO_2$ from (a) to the $SiO_2$ from (b) in the range from 30:1 to 2:1. Particular preference is given to a ratio of 20:1 to 5:1. The ratio of 12:1 to 6:1 is very particularly preferred. The relation of $SiO_2$ from (a) to the sum total of the inorganic polymorph $An_yO_z$ from (c) is in the range of 1000:1 to 5:1, preferably 500:1 to 10:1.

The mean molar mass of the oligomers prepared in accordance with the invention (measured by osmometry in dilute aqueous solutions) is preferably 150 to 800 and especially in the range from 350 to 650. The oligomeric anions of the modified silicates preferably have a particle size in the range from 20 to 200 nm, principally 75 to 100 nm.

The modified silicate mixtures according to this description are preferably used as such as the coating material. To improve the wetting of substrates, it may be advisable additionally to add small amounts (<1%) of wetting agent, for example alcohol ethoxylates or surfactants. Suitable surfactants, which are used together with the modified silicates, are anionic, cationic, amphoteric or nonionic surfactants. The nonionic surfactants are preferred. The surfactant molecules preferably have fewer than 12 carbon atoms per molecule. In order to influence the drying characteristics, it may be advisable to add hydrotropes, for example glycerin or sugars. It is equally possible to thicken the solutions if required with bodying agents, for example modified celluloses (CMC, HEC), guar or xanthans.

Applications

The aqueous solutions of modified silicates according to the present invention are—and this is a very central point for the later application thereof—VOC-free (VOCs are understood by the person skilled in the art to mean volatile organic compounds). This is because it has been found that the omission of the critical feature of the present invention, which consists in the removal of the alcohol which forms in the conversion of components (a) and (b), leads to silicate solutions which lead to poorer results in the application for coating. More particularly, the silicate solutions prepared in accordance with the invention, which are of course free of organic solvents, are particularly suitable for coating purposes (hydrophilization of surfaces), preferably for high-temperature coatings. Coatings based on the silicate solutions prepared in accordance with the invention are also notable for good chemical resistance (resistance to acids and alkali), and they also have better crack formation resistance compared to corresponding products containing alcohols (as organic solvents).

Coating of metals for corrosion protection or as an intermediate layer for further coatings, treatment of natural stone or industrially produced stone or mineral shaped bodies, surface modification of pigments

EXAMPLES

Abbreviations
MR—molar ratio of $SiO_2/Na_2O$ 3.9
SC—solids content
Preparation of the inventive silicate solutions:

Example 1

81 parts of an aqueous potassium silicate solution (molar ratio of $SiO_2/K_2O$ 3.15; solids content: 41% by weight) were mixed with 12 parts of water, and to this were subsequently added dropwise, at room temperature, 7 parts of 3-glycidyloxypropyltrimethoxysilane (GLYMO), and, after the end of the addition, the mixture was stirred at room temperature for a further 15 minutes. The clear solution was heated to 70° C. and, under gentle vacuum, approx. 10% by volume of distillate (methanol/water) was removed; for cooling, the same amount of distilled water was again added to the solution.

Example 2

67 parts of an aqueous potassium silicate solution (molar ratio of $SiO_2/K2O$ 2.9; solids content: 42% by weight) were mixed with 27 parts of water, and to this was added dropwise, at room temperature, 1 part of 3-aminopropyltriethoxysilane, and the mixture was then heated to 40° C. At 40° C., 6 parts of 3-glycidyloxy-propyltrimethoxysilane were added. The mixture was heated further to 80° C. and the solution was concentrated by 10% by volume by passing through an inert nitrogen gas stream. For cooling, the mixture was supplemented again with 10% water.

Example 3

5 parts of 4,7,10-triazadecyltriethoxysilane (TRIAMO) were added dropwise at room temperature to 96 parts of an aqueous sodium silicate solution (molar ratio of $SiO_2/Na_2O$ 3.9; solids content: 28% by weight). After the end of the addition, stirring was continued at room temperature for a further 15 minutes, then the clear solution was concentrated by 10% by volume at 80° C., then 10% water was added again for cooling.

Example 4

$KBO_2$ was stirred in water to give a 40% solution. 9 parts of GLYMO (from Evonik) were added dropwise to a potassium silicate solution (MR 3, SC 30%), then the mixture was heated to 80° C., then approx. 15 parts by volume of distillate were drawn off. For cooling, the mixture was supplemented again with 15 parts of water and the potassium borate solution was stirred in.

Example 5

At room temperature, 9 parts of tripotassium phosphate ($K_3PO_4$) were dissolved in 140 parts of an aqueous potassium silicate solution (MR 4, SC 20%). 8 parts of GLYMO (from Evonik) were added dropwise to this preliminary mixture, approx. 20 parts of distillate were drawn off at 70° C., and the mixture was supplemented again with water.

Example 6

66 parts of 40% silica sol (Koestrosol 1040) were added dropwise to 158 parts of a 17% tetramethylammonium hydroxide solution (TEAH), and the mixture was heated to 40° C. 5 parts of GLYMO (from Evonik) were added dropwise to the resulting quaternary silicate solution, 10 parts by weight of distillate were drawn off at 60° C. under gentle vacuum and then the mixture was cooled.

Example 7

70 parts of lithium hydroxide hydrate were dissolved in 700 parts of water while stirring, and 235 g of precipitated silica (Sipernat 700, from Evonik) were dissolved therein at 70° C. by a hydrothermal reaction. Finally, 5 parts of AMEO (from Evonik) were added dropwise in an open vessel, the mixture was stirred at 70° C. for a further 30 minutes, and then cooled while stirring without heating further.

Example 8

500 parts of quartz sand, 2 parts of precipitated alumina and 1 part of titanium dioxide in anatase polymorph were mixed and reacted hydrothermally in an autoclave with 500 parts of concentrated potassium hydroxide solution (50%) and 500 parts of water at 200° C. to give an inorganically modified potassium waterglass solution, the hot reaction mixture was cooled to 80° C. by adding 1000 parts of water and 50 parts of Geniosil CF20 (from Momentive) were added dropwise in an open vessel within 1 hour. Without further heating, the mixture was left to cool while stirring for another 5 hours.

N.B.:

In all cases of the above examples 1-8, headspace gas chromatography on the solutions determined that they were free from VOCs (VOC=content of volatile organic compounds). By $^1H$, $^{13}C$, $^{29}Si$ NMR measurements on the solutions, which had been freeze-dried beforehand, it was possible to detect the reaction of the silanes and siloxanes with the inorganic polyanions in solution to give mixed oligomers.

What is claimed is:

1. A method of hydrophilizing a surface, the method comprising applying an aqueous solution of modified silicates to the surface to form a coating, the aqueous solution of modified silicates comprising a modified silicate dissolved in water, wherein the modified silicate is obtained by reacting
   (a) an initially charged aqueous solution of silicates of the general formula $M_2O \cdot mSiO_2$, where M is a cation from the group of $Li^+$, $Na^+$, $K^+$, $NY_4^+$, where Y is a hydrogen atom and/or an alkyl or alkenyl radical having 1 to 22 carbon atoms, where m is from 1 to 4, and
   (b) at least one silane of the general formula (i)

wherein X is independently $OCH_3$, $OC_2H_5$, $OC_3H_7$, $OCOCH_3$; R is a saturated or unsaturated, linear or branched, or cyclic radical having at least one oxygen and/or nitrogen atom and at least 2 carbon atoms, and n is from 1 to 3,
   at temperatures of 5 to 100° C., wherein the alcohols formed in the reaction are removed by distillation,
   wherein the aqueous solution is clear and free of organic solvents and is pumpable.

2. The method of claim 1, wherein the coating provides corrosion protection.

3. The method of claim 1, wherein the coating provides an intermediate layer for further coatings; treatment of natural stone or industrially produced stone or mineral shaped bodies; or surface modification of pigments.

4. A hydrophilic coating comprising an aqueous solution of modified silicates comprising a modified silicate dissolved in water, wherein the modified silicate is obtained by reacting
   (a) an initially charged aqueous solution of silicates of the general formula $M_2O \cdot mSiO_2$, where M is a cation from the group of $Li^+$, $Na^+$, $K^+$, $NY_4^+$, where Y is a hydrogen atom and/or an alkyl or alkenyl radical having 1 to 22 carbon atoms, where m is from 1 to 4, and (b) at least one silane of the general formula (i)

(i)

wherein X is independently $OCH_3$, $OC_2H_5$, $OC_3H_7$, $OCOCH_3$; R is a saturated or unsaturated, linear or branched, or cyclic radical having at least one oxygen and/or nitrogen atom and at least 2 carbon atoms, and n is from 1 to 3, at temperatures of 5 to 100° C., wherein the alcohols formed in the reaction are removed by distillation, wherein the aqueous solution is clear and free of organic solvents and is pumpable.

* * * * *

UNITED STATES PATENT AND TRADEMARK OFFICE
CERTIFICATE OF CORRECTION

| | |
|---|---|
| PATENT NO. | : 9,090,781 B2 |
| APPLICATION NO. | : 13/147425 |
| DATED | : July 28, 2015 |
| INVENTOR(S) | : Ralf Bohlander |

Page 1 of 1

It is certified that error appears in the above-identified patent and that said Letters Patent is hereby corrected as shown below:

In the specification

In Column 1, after line 11: --BACKGROUND-- should be entered.

In Column 1, before line 12: --Field of the Invention-- should be entered.

In Column 1, line 17: "BACKGROUND" should be deleted.

In Column 1, after line 17: --Background Information-- should be entered.

In Column 1, line 19: "Field of the Invention" should be deleted.

In Column 1, before line 40: --SUMMARY-- should be entered.

In Column 1, before the heading "Component (a)": --DETAILED DESCRIPTION-- should be entered.

Signed and Sealed this
Twenty-ninth Day of December, 2015

Michelle K. Lee
*Director of the United States Patent and Trademark Office*